May 26, 1925.

S. SZUBA

BEARING

Filed Sept. 19, 1922    2 Sheets-Sheet 1

1,539,702

Stanislaw Szuba
INVENTOR

BY Victor J. Evans
ATTORNEY

WITNESS:

May 26, 1925.  1,539,702
S. SZUBA
BEARING
Filed Sept. 19, 1922    2 Sheets-Sheet 2

Stanislaw Szuba
INVENTOR
BY Victor J. Evans
ATTORNEY

Patented May 26, 1925.

1,539,702

UNITED STATES PATENT OFFICE.

STANISLAW SZUBA, OF ELIZABETH, NEW JERSEY.

BEARING.

Application filed September 19, 1922. Serial No. 589,220.

*To all whom it may concern:*

Be it known that I, STANISLAW SZUBA, a citizen of the United States, residing at Elizabeth, in the county of Union and State of New Jersey, have invented new and useful Improvements in Bearings, of which the following is a specification.

This invention relates to ball bearings, the general object of the invention being to so form the bearings that the use of guides is rendered unnecessary and to make the races for the balls deep so as to embrace large portions of the balls.

A further object of the invention is to make the device of a plurality of parts which are threadedly connected together.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
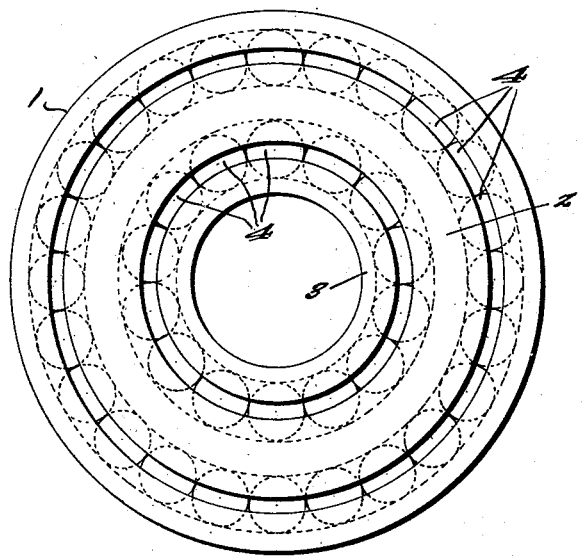
Figure 1 is an end view of the invention.
Figure 2:
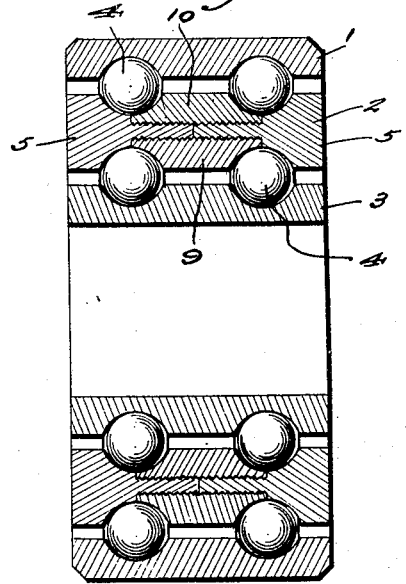
Figure 2 is a central sectional view.
Figure 3:
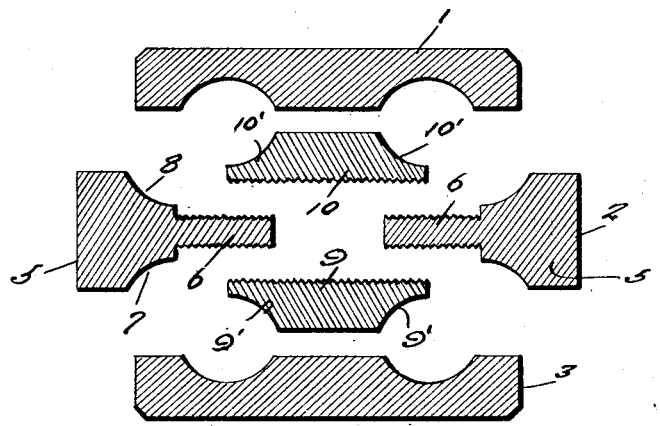
Figure 3 is a fragmentary sectional view showing the parts disassembled.

In these views 1 indicates the outer race member, 2 the central member and 3 the inner member, the balls being shown at 4, two rows being arranged between the inner and central members and two rows between the outer and central members. It will of course be understood that any number of rows of balls may be used. The inner and outer members are constructed somewhat as usual though I prefer to make the grooves or race-ways of considerable depth. The central member is formed in sections, there being a pair of end sections 5, each of which is provided with an inner screw threaded part 6 which is of reduced dimensions with the threads on its inner and outer circumference. Each member carries a part of an inner race 7 and an outer race 8. The inner threads of the parts 5 are engaged by the inner sleeve 9 which is threaded upon its outer circumference to engage said threads and the outer threads are engaged by the outer sleeve 10 which is threaded upon its inner circumference to engage said threads. The ends of the sleeve 9 are provided with the grooves 9' which form with the grooves 7 the race-way for the inner rows of balls while the sleeve 10 is provided with the grooves 10' at its ends which form with the grooves 8 the race-ways for the outer rows of balls.

Figure 4:
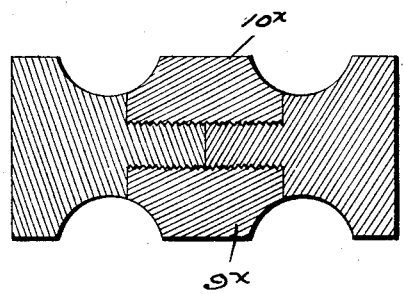
Figure 4 is a sectional view showing a modification.

In the form shown in Figure 4 the sleeves $9^x$ and $10^x$ are made much shorter than the sleeves in the first modification so that the balls are much closer together.

Figure 5:
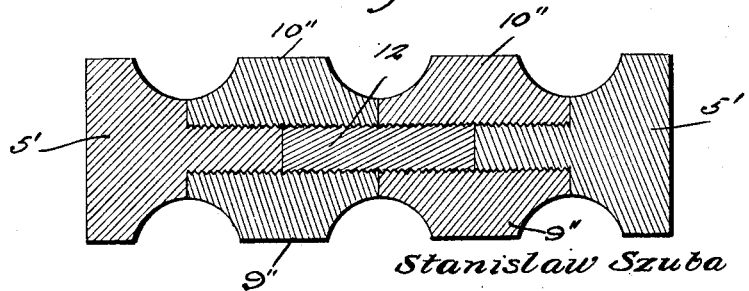
Figure 5 is a sectional view of another modification.

In the modification shown in Figure 5 the parts are arranged to support six rows of balls and the central member is composed of two pairs of inner sleeves 9'' and two pairs of outer sleeves 10''. A ring-shaped member 12, having both of its circumferences screw threaded to engage portions of the sleeves, is placed between the ends of the outer members 5'. It will of course be understood that the bearing may be made longer and provided with any number of ball races.

By this invention the use of guides for holding the balls in place is rendered unnecesary as the parts carrying the race-ways hold the balls in place, these race-ways being made of considerable depth to engage large surfaces of the balls. I so arrange the parts that the junctions of the sleeves with the outer members are slightly off center so that the balls will not come in contact therewith and cause friction. The balls are in contact with solid walls which eliminates friction and the bearing parts are very strong as will be seen. The bearing can be made with as many ball grooves as desired by simply building the bearing up as shown in Figure 5.

This bearing will carry a maximum load with minimum power consumption and it can be used as a large bearing for replacing the roller bearings, used with large bearings, at a great saving in power and in situations where the ordinary ball bearing cannot be used on account of the fact that it is not wide enough.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A bearing of the class described comprising inner and outer members, having ball grooves therein, a central member formed of end sections having inwardly projecting extensions which are screw threaded on their exterior and interior faces, interior and exterior sleeves threaded to engage said threaded faces to hold the end members together, said members having grooves at their meeting points for forming ball grooves and balls engaging the grooves.

2. A bearing of the class described comprising inner and outer members having ball grooves therein, a central member formed of end members having screw threaded extensions, a ring placed between the extensions and having both faces threaded, interior and exterior sleeves threaded to engage the extensions and ring, the end members and rings having grooves at their meeting points for forming ball grooves and balls engaging the grooves.

In testimony whereof I affix my signature.

STANISLAW SZUBA.